United States Patent [19]

Marechal

[11] Patent Number: 5,673,973
[45] Date of Patent: Oct. 7, 1997

[54] PUBLIC TRANSPORTATION SEATING COMPRISING A PLURALITY OF SEATS WITH VARIABLE SPACING

[75] Inventor: Robert René Lucien Marechal, Paris, France

[73] Assignee: Societe Industrielle et Commerciale de Materiel Aeronautique (societe anonyme), Issoudun, France

[21] Appl. No.: 431,853

[22] Filed: May 1, 1995

[30] Foreign Application Priority Data

May 2, 1994 [FR] France .................. 94 05328

[51] Int. Cl.⁶ .................................................. A47C 7/02
[52] U.S. Cl. .................................. 297/452.4; 297/257
[58] Field of Search .......................... 297/452.4, 232, 297/257, 383, 248; 244/118.6

[56] References Cited

U.S. PATENT DOCUMENTS

| | | | |
|---|---|---|---|
| 1,400,717 | 12/1921 | Benson et al. | 297/452.4 |
| 2,800,947 | 7/1957 | Thiem | 297/383 |
| 3,759,572 | 9/1973 | Koepke | 297/452.4 |
| 4,294,048 | 10/1981 | Sutter | 297/232 X |
| 4,850,159 | 7/1989 | Conner | 297/452.4 X |
| 4,881,702 | 11/1989 | Slettebak | 297/232 X |

FOREIGN PATENT DOCUMENTS 658883  6/1929  France .................. 297/232

*Primary Examiner*—Laurie K. Cranmer
*Attorney, Agent, or Firm*—Young & Thompson

[57] ABSTRACT

The device concerns a driving gear for Convertible public transportation seats with variable spacing (2a, 2b, 2c) along a dimensional axis (3), the seats (2a, 2b, 2c) being mounted on a structure (4) with several adjacent seats (2a, 2b, 2c), with each of them separated from the next by a space between frames (5) and sliding on the structure (4) along the dimensional axis (3). A driving gear comprises a worm (6) whose axis (7) is parallel to the dimensional axis (3) and which is coupled with at least one nut (8) attached to the seat (2a, 2b, 2c) to be driven, in such a way that when the worm (6) is forced to rotate in one direction the seat (2a, 2b, 2c) is driven from one extreme position to another and when the worm (6) is forced to rotate in the other direction the seat (2a, 2b, 2c) is driven to move in the opposite direction.

9 Claims, 4 Drawing Sheets

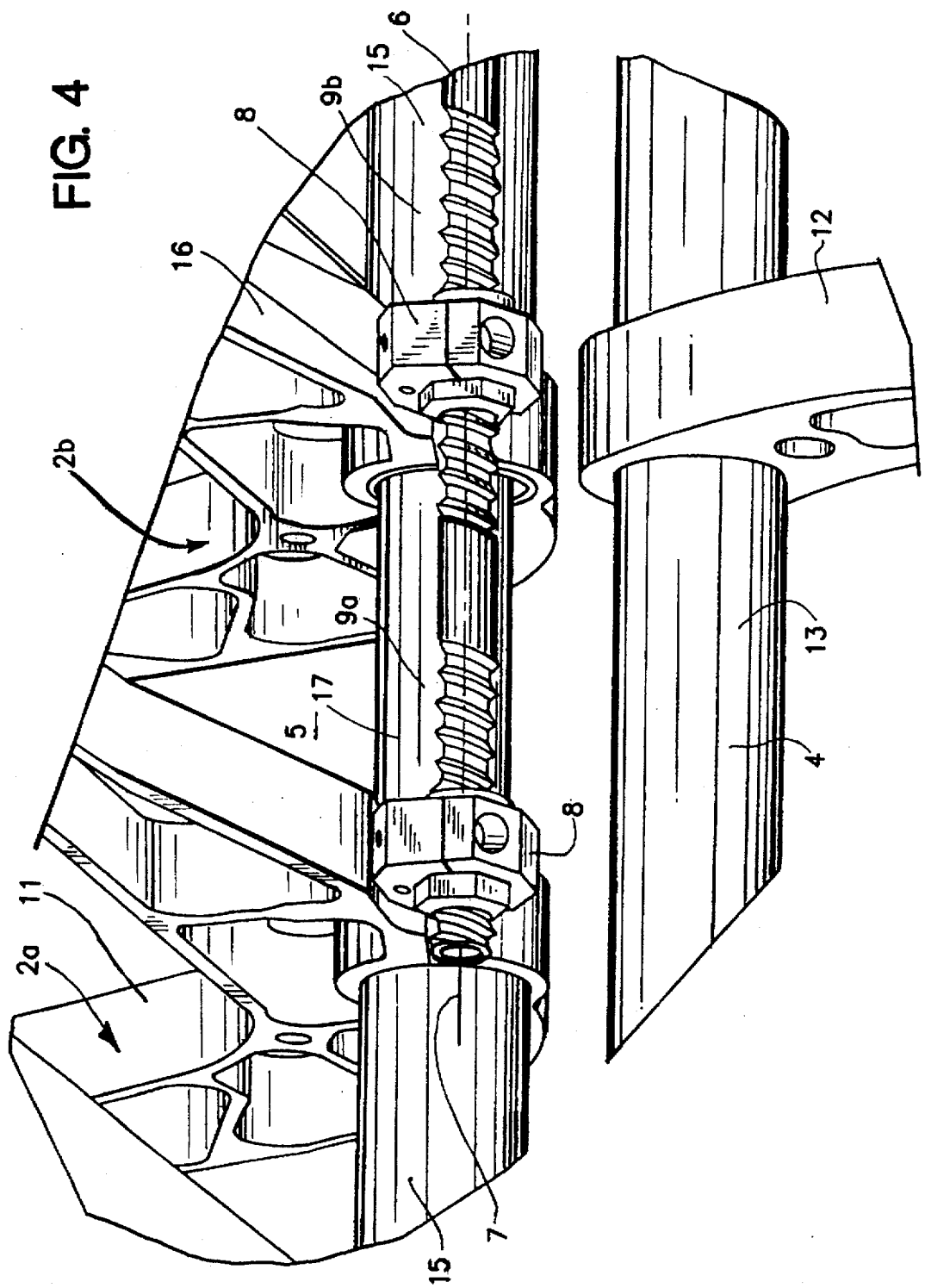

PUBLIC TRANSPORTATION SEATING COMPRISING A PLURALITY OF SEATS WITH VARIABLE SPACING

The invention concerns a structure comprising convertible public transportation seats with variable spacing and equipped with a driving gear to vary the spacing.

The invention mainly concerns such a structure having a driving gear for convertible public transportation seats with variable spacing along a dimensional axis.

These seats are mounted on a structure with several adjacent seats. Each of these seats is separated from the next by a space between frames and slides along the structure's dimensional axis.

Such seats are mainly used by airline companies so as to be able to adapt the passenger cabin of one same airplane according to how full the different comfort and fare classes are.

Thus, there are structures comprising a number of seats having a given width for comfort and in which the space between frames is varied so as to increase or decrease the width for comfort of each seat.

The purpose of the present invention is to provide convertible public transportation seats with variable spacing of the type described above which ensures a maximum amount of safety, requires a minimum amount of maintenance and is easy to manipulate.

For this purpose, the invention concerns convertible public transportation seats with variable spacing along a dimensional axis, the seats being mounted on a structure with several adjacent seats, with each of them separated from the next by a space between frames and sliding on said structure along the dimensional axis. The driving gear makes it possible for at least one seat to switch from a first extreme position referred to as maximum spacing in which the space between frames is at a maximum, to a second extreme position referred to as minimum spacing in which the space between frames is at a minimum.

According to the invention, the driving gear comprises a worm whose axis is parallel to the dimensional axis and which is coupled with at least one nut attached to the seat to be driven, in such a way that when the worm is forced to rotate in one direction the seat is driven from one of the two extreme positions to the other and when the worm is forced to rotate in the other direction the seat is driven to move in the opposite direction.

The worm's rotational support bearing can be attached to another seat and/or to the structure.

One worm can drive a plurality of seats.

The size of the displacement can be identical for every seat, i.e. the worm comprises a single thread for all of the seats driven.

In another embodiment, the thread is adjusted for each of the seats by varying the size or the direction of the worm pitch.

Advantageously, the thread(s) is/are self-locking. This means that if a force is exerted on one of the seats driven in the direction of the dimensional axis, the seat will not move. The only way to move the seats driven is to activate the worm.

The worm can be either activated by hand or by an electric motor or equivalent.

The invention also concerns a structure comprising convertible public transportation seats with variable spacing of a type including a fixed part on which the seats are mounted adjacent to one another and slide along a dimensional axis between two positions, and activating means to make the seats switch from one position to another. According to the invention, the activating means consist of a driving gear such as described above.

Further advantages and features of the invention will be clearly understood upon reading the description which follows with reference to the attached drawings in which:

FIG. 4 is an enlarged schematic representation of detail indicated by the letter C in the FIG. 1.

Figure 1:
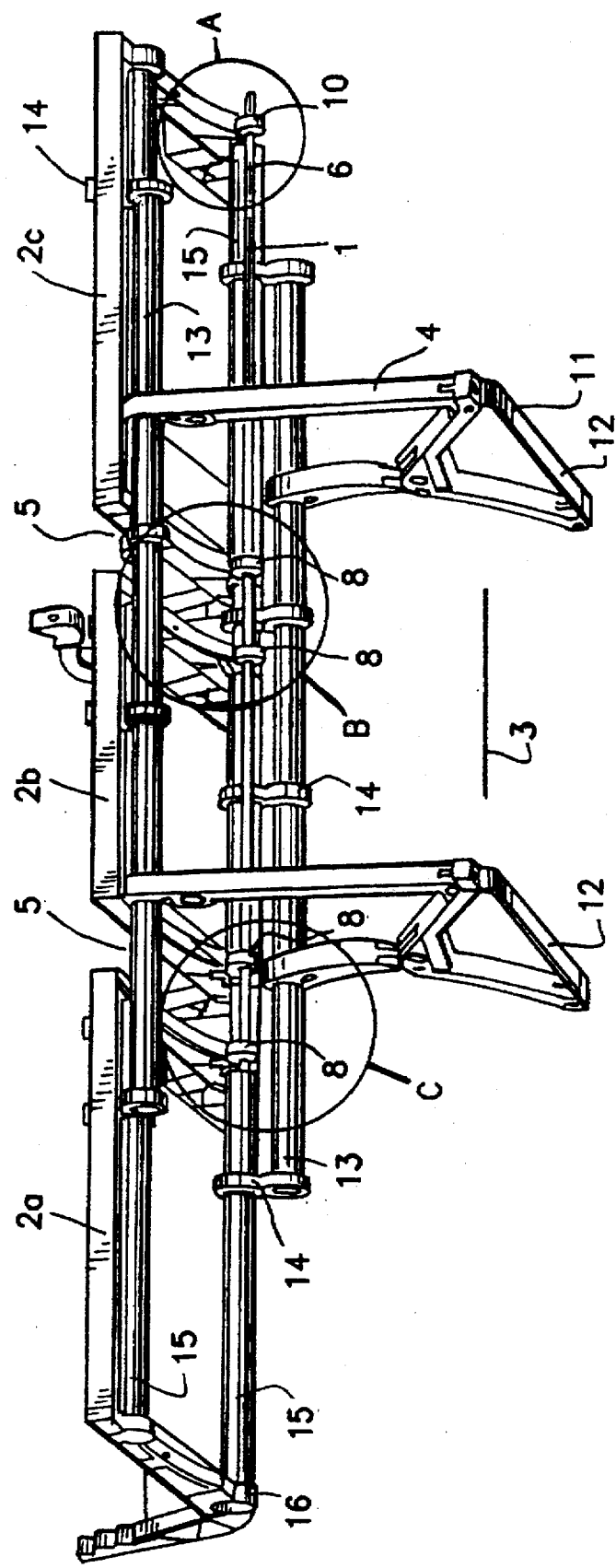
FIG. 1 is a schematic representation of a structure equipped with a driving gear according to the invention.
Figure 2:
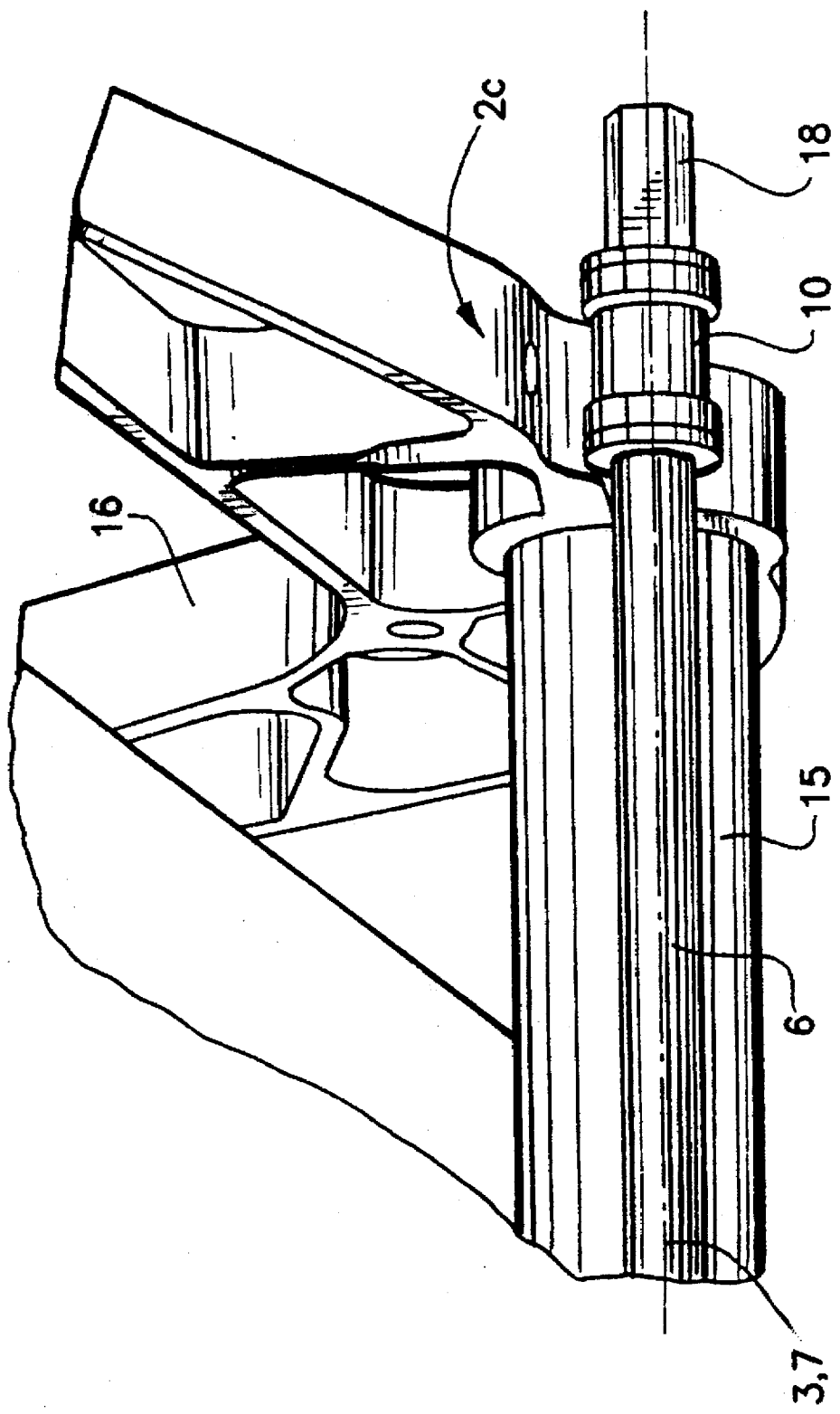
FIG. 2 is an enlarged schematic representation of detail indicated by the letter A in the FIG. 1.

The invention concerns a driving gear 1 for convertible public transportation seats 2a, 2b, 2c with variable spacing along a dimensional axis 3. The seats 2a, 2b, 2c are mounted on a structure 4 with several adjacent seats 2a, 2b, 2c. Each of the seats 2a, 2b, 2c is separated from the next by a space between frames 5 and slides on the structure 4 along the dimensional axis 3.

The structure shown in the drawings concerns a structure comprising three adjacent seats 2a, 2b, 2c with variable spacing. This structure 4 includes a fixed part 11 on which the seats 2a, 2b, 2c are able to slide. In the embodiment shown in the figures, the fixed part comprises at least two transverse supports 12 separated from each other and intended to be fixed to the floor of the passenger cabin of the means of public transportation. These transverse supports 12 are rigidly joined together by longitudinal support elements 13 whose overall axis is parallel to the dimensional axis 3.

Each longitudinal support element 13 comprises slide elements 14 attached to the longitudinal support elements 13 and whose axes are parallel to and distinct from the overall axis of the longitudinal support elements 13 to which they are associated.

Longitudinal support elements 15 making up a part of each of the seats 2a, 2b, 2c slide within these slide elements 14 and are guided in translational motion along the dimensional axis 3.

Such a structure, wherein the sliding is ensured by a slide offset with respect to the longitudinal support elements, makes it possible to substantially limit the area of the sliding regions. As a result, the accumulation of dust in the sliding regions is limited, it is easier to gain access to these sliding regions, and jamming due to the deformation of the sliding means is also limited.

Another advantage of such a structure results from the fact that the link between the slide and the longitudinal support element can comprise a shock absorption device in addition to or instead of those which are already typically present on the transverse supports.

Figure 3:
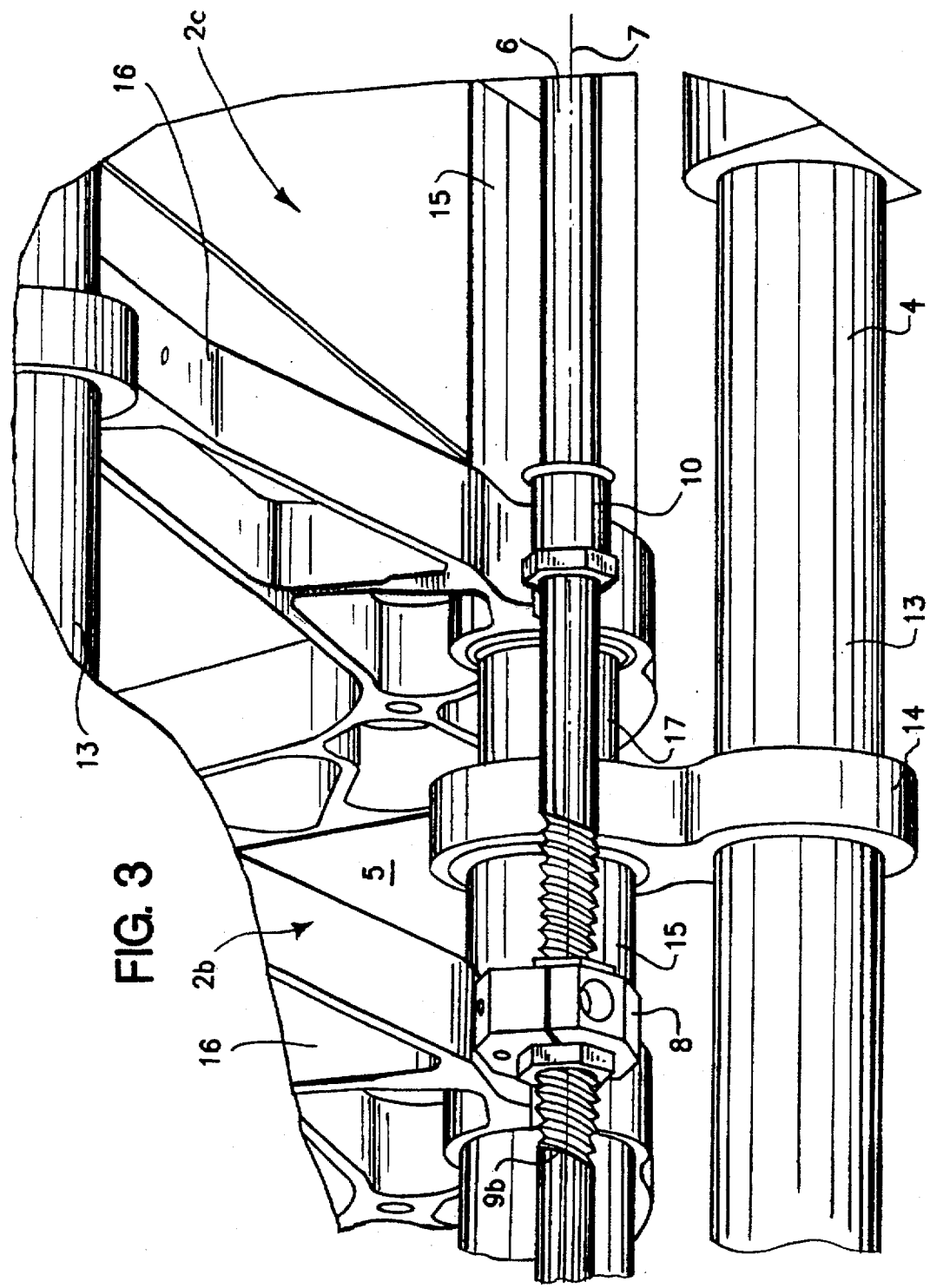
FIG. 3 is an enlarged schematic representation of detail indicated by the letter B in the FIG. 1.

As shown in FIGS. 3 and 4, the longitudinal support elements 15 of a seat can be capable of sliding in a co-axial manner with the longitudinal elements 15 of the adjacent seat.

This is made possible by an end coupling 17 of one of the longitudinal support elements 15 having a diameter inferior to that of the adjacent seat's hollow longitudinal support element 15 within which it slides.

Each seating of the seats 2a, 2b, 2c is delimited on either side by end-of-seating transverse tie-bars 16.

These end-of-seating transverse tie bars 16 are rigidly joined to the longitudinal support elements 15 of the seat which they define.

The driving gear 1 according to the invention comprises a worm 6 whose axis 7 is parallel to the dimensional axis 3 and which is coupled with at least one nut 8 attached to the seat 2a, 2b, 2c to be driven.

The worm can be rigidly joined to either a seat 2c or to the rigid structure 4 by at least one rotational support bearing 10. This rotational support bearing 10 allows the worm to freely rotate about its axis 7 and is displaced in translational motion along with the element to which it is attached.

The worm 6 can drive a plurality of seats 2a, 2b, 2c.

The worm 6 can comprise a single thread for all of the seats driven. As a result, all of the seats driven undergo an equivalent displacement.

In an alternate embodiment, the worm 6 can comprise a plurality of different threads 9a, 9b each associated with one or more seats driven. As a result, it is possible to obtain every possible movement of the driven seats with respect to one another. For example, if all the threads are in the same direction but the pitches are different, the seats will move in the same direction with each thread inducing a translational movement of different magnitude along the dimensional axis. In another example, certain threads can be with respect to the others in such a way that, when the worm 6 is rotated in the same direction, the seats will move in opposite direction depending on whether the thread is in one direction or the other.

The threads 9a, 9b, 9c are at an angle with respect to the axis of the worm 6 in such a way that they are self-locking. This means that the thread is inclined in such a way that if a force is exerted on one of the seats 2a, 2b, 2c in the direction of the dimensional axis the seat will not move. The only way to make the seats move with respect to one another is to activate the worm 6.

This worm 6 can be either activated by hand or by an electric motor or equivalent.

In the embodiment shown in the figures, the worm is arranged parallel to the rear longitudinal support element 13. The rotational support bearing 10 of the worm 6 is joined to the end-of-seating transverse tie-bar 16 of the end seat 2c near the junction of said tie-bar 16 with the rear longitudinal support element 15 making up said seat 2c.

Similarly, the nuts 8 are arranged on the end-of-seating transverse tie-bars 16 of the seats driven near the junction of said tie-bars 16 with the corresponding longitudinal support elements 15. The threads 9a, 9b shown in the figures are such that the end seat 2a and the middle seat 2b will move in the same direction. However, due to the difference in pitch, the magnitude of the movement of seat 2b will exceed that of seat 2a for an equivalent number of turns applied to the worm 6.

I claim:

1. Convertible public transportation seating with variable spacing along an axis, comprising a plurality of seats, a structure on which said seats are slidably movable relative to each other in the direction of said axis, driving gear means for sliding said seats along and relative to said structure and relative to each other, said driving gear means comprising a worm having an axis disposed parallel to the first-mentioned axis, at least one nut engaged with the worm and secured to at least one said seat, whereby when the worm is rotated in one direction at least one seat moves away from at least one other seat and when the worm is rotated in the opposite direction said at least one seat moves toward said at least one other seat thereby to vary the spacing between the seats.

2. Seating as claimed in claim 1, wherein the worm has a rotational support bearing attached to a said seat.

3. Seating according to claim 11, wherein said worm has a rotation support bearing attached to said structure.

4. Seating as claimed in claim 11, wherein a single said worm moves a plurality of seats.

5. Seating as claimed in claim 11, wherein said worm has a single pitch for all of the movable seats.

6. Seating as claimed in claim 11, wherein the worm has plural different threads with different pitches each engaged with a different driven seat.

7. Seating according to claim 6, wherein said different pitches are reversed from each other.

8. Seating as claimed in claim 1, wherein said worm is self-locking.

9. Seating as claimed in claim 1, wherein said seats are airplane seats.

* * * * *